United States Patent
Francke et al.

(10) Patent No.: US 6,731,065 B1
(45) Date of Patent: May 4, 2004

(54) APPARATUS AND METHOD FOR RADIATION DETECTION WITH RADIATION BEAM IMPINGING ON PHOTOCATHODE LAYER AT A GRAZING INCIDENCE

(75) Inventors: Tom Francke, Sollentuna (SE); Vladimir Peskov, Stockholm (SE)

(73) Assignee: XCounter AB, Danderyd (SE)

( * ) Notice: Subject to any disclaimer, the term of this patent is extended or adjusted under 35 U.S.C. 154(b) by 292 days.

(21) Appl. No.: 09/698,174

(22) Filed: Oct. 30, 2000

(30) Foreign Application Priority Data

Jun. 5, 2000 (SE) .............................. 0002080

(51) Int. Cl.[7] ............................................. H01J 43/04
(52) U.S. Cl. ................... 313/532; 313/103 R; 313/538
(58) Field of Search .................. 313/532, 538, 313/541, 544, 103 R; 250/214 VT

(56) References Cited

U.S. PATENT DOCUMENTS

| | | | |
|---|---|---|---|
| 3,394,261 A | | 7/1968 | Manley et al. |
| 3,710,125 A | * | 1/1973 | Jacobs et al. .......... 250/214 VT |
| 3,814,996 A | * | 6/1974 | Enstrom et al. ............... 257/10 |
| 3,912,522 A | * | 10/1975 | Kaes et al. .............. 313/103 R |
| 4,339,659 A | * | 7/1982 | Johnson ................. 250/214 VT |
| 4,493,096 A | * | 1/1985 | Rieke ......................... 378/98.4 |
| 4,608,519 A | * | 8/1986 | Tosswill ...................... 313/528 |
| 5,192,861 A | * | 3/1993 | Breskin et al. ........ 250/214 VT |
| 5,308,987 A | | 5/1994 | Wuest et al. |
| 5,602,397 A | * | 2/1997 | Pitts et al. .................... 250/374 |
| 5,614,722 A | * | 3/1997 | Solberg et al. .............. 250/374 |
| 5,635,706 A | | 6/1997 | She et al. |
| 5,692,507 A | * | 12/1997 | Seppi et al. ................. 600/407 |

FOREIGN PATENT DOCUMENTS

| | | |
|---|---|---|
| EP | 0450571 A2 | 10/1991 |
| WO | A1-9923859 | 5/1999 |

* cited by examiner

*Primary Examiner*—Nimeshkumar D. Patel
*Assistant Examiner*—Glenn Zimmerman
(74) *Attorney, Agent, or Firm*—Birch, Stewart, Kolasch & Birch, LLP

(57) ABSTRACT

The present invention relates to an apparatus for detection of radiation comprising a photocathode layer adapted to release photoelectrons in dependence on incident radiation; a radiation entrance arranged such that a beam of radiation can be entered into the apparatus through said radiation entrance and can impinge on said photocathode layer at grazing incidence; an electron avalanche amplifier adapted to avalanche amplify photoelectrons released from said photocathode layer; and a readout arrangement adapted to detect avalanche amplified electrons from said amplifier. The invention further relates to a corresponding method for detection of ionizing radiation and to an arrangement for use in planar beam radiography comprising the detector apparatus.

37 Claims, 2 Drawing Sheets

APPARATUS AND METHOD FOR RADIATION DETECTION WITH RADIATION BEAM IMPINGING ON PHOTOCATHODE LAYER AT A GRAZING INCIDENCE

TECHNICAL FIELD OF THE INVENTION

The present invention generally relates to an apparatus and method for detection of radiation.

The invention is usable in a variety of fields including e.g. medical radiology, computerized tomography (CT), microscopy, and non-destructive testing.

DESCRIPTION OF RELATED ART AND BACKGROUND OF THE INVENTION

Gaseous detectors, in general, are very attractive at photon energies lower than approximately 10 keV. The main advantages of gaseous detectors are that they are cheap to manufacture compared to solid state detectors, and that they can employ gas multiplication to strongly (on orders of magnitude) amplify the signal amplitudes. However, at energies exceeding 10 keV the gaseous detectors are less attractive as the stopping power of the gas decreases rapidly with increased photon energy. This results in a heavily deteriorated spatial resolution due to parallax errors of the conversion points of the often divergent incident beam of radiation, and due to extended tracks of so-called long-range electrons, which are created as a result of the X-ray absorption.

An improved spatial resolution is achieved by a gaseous detector for use in planar beam radiography, in which electrons released by interactions between photons and gas atoms can be extracted in a direction essentially perpendicular to the incident radiation. A detector of such a kind is described in our copending international application WO99/23859 entitled A method and a device for planar beam radiography and a radiation detector and filed on Oct. 19, 1998.

Such detector comprising interactions between photons and gas atoms need, however, to be relatively deep and comprise a pressurized gas. Further, such detector need to use a gas optimized both for interaction with the incident radiation and with accelerating electrons (during the electron multiplication).

SUMMARY OF THE INVENTION

An object of the present invention is to provide an apparatus and method for detection of ionizing radiation, which employ avalanche amplification, and by which measurements of high spatial resolution are obtainable.

A further object of the present invention is to provide an apparatus and method for detection of ionizing radiation, which exhibit high signal-to-noise ratios.

Still a further object of the invention is to provide an apparatus and method for detection of ionizing radiation, which are sensitive and can thus be used employing very low X-ray fluxes.

Yet a further object of the present invention is to provide an apparatus and method for detection of ionizing radiation, which are effective, fast, accurate, reliable, easy to use, and of low cost.

Still a further object of the invention is to provide an apparatus and method for detection of ionizing radiation, in which electrons released during detection, can be extracted in a direction essentially perpendicular to the incident radiation. Hereby it is possible to obtain a particularly high spatial resolution.

Yet a further object of the invention is to provide an apparatus and method for detection of ionizing radiation, which can operate at high X-ray fluxes without performance degradation and has a long lifetime.

These objects among others are, according to the present invention, attained by apparatus and methods as claimed in the appended Claims.

By employing avalanche amplification of electrons released from a photocathode of the detection apparatus a particularly sensitive apparatus and method are achieved, which provide for the employment of extremely low doses of radiation, still obtaining signal levels high enough for construction of images, which exhibit very low noise levels.

A further advantage of the invention is that the inventive detector apparatus is not very sensitive to magnetic fields.

Yet a further advantage of the invention is that it provides for the manufacture and use of sensitive large-area detector apparatus to a low cost.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–3, which are given by way of illustration only, and thus are not limitative of the invention.

DETAILED DESCRIPTION OF PREFERRED EMBODIMENTS

In the following description, for purposes of explanation and not limitation, specific details are set forth, such as particular dimensions and materials in order to provide a thorough understanding of the present invention. However, it will be apparent to one skilled in the art that the present invention may be practiced in other embodiments that depart from these specific details. In other instances, detailed descriptions of well-known apparatus and processes are omitted so as not to obscure the description of the present invention with unnecessary details.

Figure 1:
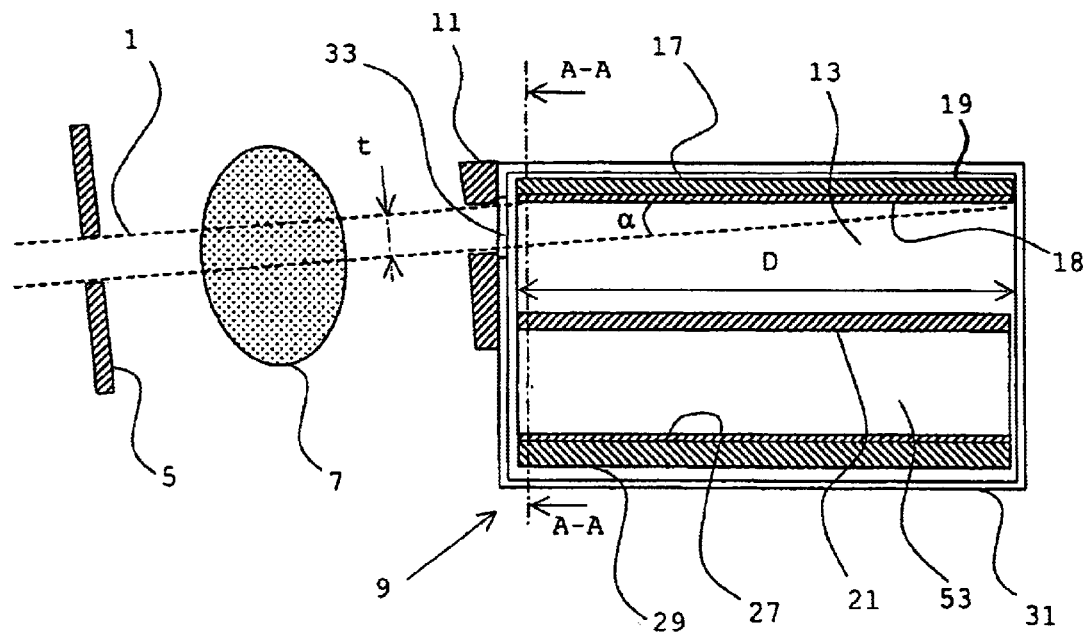
FIG. 1 illustrates schematically, in cross sectional view, an arrangement for planar beam radiography, according to a first embodiment of the present invention.

With reference to FIG. 1, which schematically illustrates, in a sectional view in a plane orthogonal to the plane of a planar X-ray beam 1, an arrangement for planar beam radiography, a first embodiment of the present invention will be described.

The arrangement includes an X-ray source (not shown), which together with a collimator window 5, produce the planar fan-shaped X-ray beam 1, for irradiation of an object 7 to be imaged. The collimator window 5 can be replaced by other means for forming an essentially planar X-ray beam, such as an X-ray diffraction mirror or an X-ray lens etc.

The beam transmitted through the object 7 enters a detector apparatus 9. Optionally a slit or collimator window 11, which is aligned with the X-ray beam and forms the entrance for the X-ray beam 1 to the apparatus 9, is provided. A major fraction of the incident X-ray photons are detected in detector 9, which includes chamber 13, 53, photocathode 17,18, avalanche cathode 21, and avalanche anode 27, 29 arrangements.

The apparatus 9 is arranged and oriented such that the X-ray beam can enter sideways between the photocathode arrangement 17, 18 and the avalanche cathode arrangement 21, and impinge on the photocathode arrangement at grazing incidence, i.e. at a small grazing angle α. Preferably the relationship between the thickness t of the planar beam, the grazing angle α, and the depth D of apparatus 9 (i.e. length in the direction of incident radiation) are arranged such that a major portion of the photocathode arrangement is irradiated by beam 1. Note that the planar beam thickness and the grazing angle α have been exaggerated in FIG. 1 for illustrative purposes. Typical values are a planar beam thickness t of about 50–500 μm, a grazing angle α of about 0.05–500 mrad (preferably 0.50–50 mrad), and a detector apparatus depth D of about 1–10 cm.

The photocathode arrangement 17, 18 comprises a dielectric substrate 17, and a thin photocathode layer 18, which preferably is a 0.00001–0.1 mm thick layer of CsI, or an organic photo converters or any other efficient gaseous, liquid or solid photo converter. The photocathode layer material should have a low work function such that it can release photoelectrons in dependence on the incident radiation beam 1, i.e. the work function has to be lower than the photon energy of radiation beam 1.

Further, photocathode arrangement 17, 18 may comprise a protective layer 19 on the photocathode layer surface, which preferably is a 0.01–1 μm thick layer of e.g. CsI. Photocathodes are generally sensitive to small impurities in any gas in contact with it, which impurities cause degradation of the quantum efficiency of the photocathode with time. Thus, the protective layer 19 shall protect the photocathode layer is from direct contact with gases within chamber 13, 53, of apparatus 9, but shall be transparent to the incident radiation as well as to the electrons released from the photocathode layer surface. Further, the protective layer 19 shall advantageously be opaque to light since there may occur fluorescence in chamber 13, 53 and this fluorescence light has to be prevented from reaching the photocathode layer and thus from striking out more electrons, which would affect the detection in an unwanted manner. If the protective layer 19 is not opaque to light it can be covered by a thin metallic layer, which is opaque to light and transparent to incident radiation and electrons.

The electrode arrangements 17, 18 and 21 are preferably mutually substantially parallel and separated by a short distance, e.g. 10 μm–10 mm. Further, during use, a first voltage is applied between photocathode 18 and avalanche cathode 21, resulting in a drift field in region 13 causing drift of electrons towards electrode 21.

Chamber 13, 53 is preferably filled with a gas, which can be for example $CO_2$ or a mixture of for example helium and isobutane, or any other gas suitable for electron avalanche multiplication. The gas is preferably at atmospheric pressure, but can be both at under- as well as overpressure. In such instance, the detector includes a gas tight housing 31 with a slit entrance window 33 of a radiation permeable material, through which the X-ray beam 1 enters the detector. Further, it shall be appreciated that the gas mixture composition and pressure are selected such that the gas does not absorb incident radiation beam 1, or only absorb incident radiation to a smaller extent.

Apparatus 9 is arranged such that the released photoelectrons will drift towards and enter an electron avalanche amplification region, preferably by passing through avalanche cathode arrangement 21, and wherein they will be multiplied by means of a second voltage, which, during use, is applied between avalanche cathode arrangement 21 and avalanche anode arrangement 27, 29. The avalanche anode arrangement comprises a conductive anode layer 27 on a dielectric substrate 29.

The second voltage is selected such that photoelectrons from chamber section 13 pass cathode 21 and is accelerated towards anode arrangement 27, 29 resulting in electron multiplication and thus multiple avalanche electrons reaching arrangement 27, 29. The avalanche anode arrangement constitutes preferably also a read-out arrangement of apparatus 9 for the detection of pulses induced by the electron avalanches.

Alternatively, the read-out arrangement can be formed separated from anode arrangement 27, 29 (not shown in FIG. 1).

The read-out arrangement 27, 29 is further connected to a signal processing device (not shown in FIG. 1) for further processing of the detected pulses. The pulses derivable from ionization by different X-ray photons are individually detectable, and hence single-photon detection is realized.

The X-ray source, the collimator window 5, the optional collimator window 11 and the detector 9 are preferably connected and fixed in relation to each other by a suitable means for example a support (not shown in FIG. 1).

Figure 2:
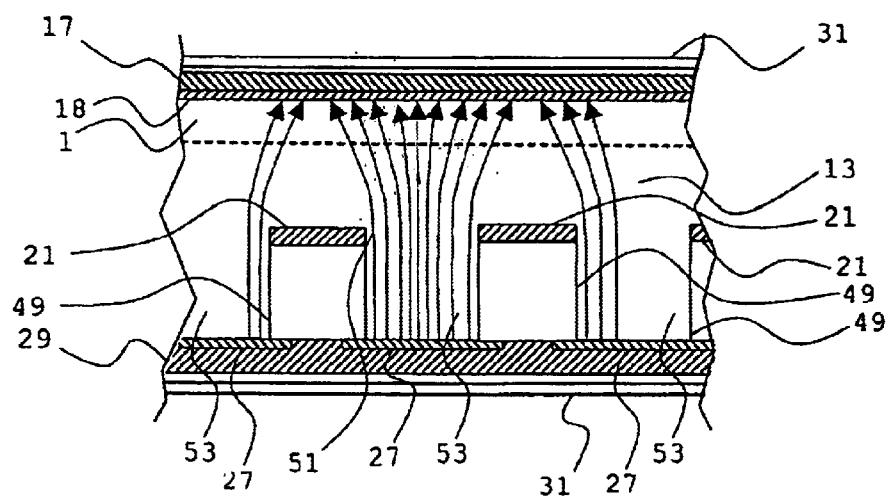
FIG. 2 is a schematic, partly enlarged, cross sectional view of the first embodiment as taken along A—A in FIG. 1.

Referring next to FIG. 2, which shows a schematic, partly enlarged, cross sectional view, taken along A—A of FIG. 1, the detector, will be further described. It shall, however, be appreciated that the present invention is not limited to such a design. For instance, other possible avalanche amplification means designs are further elaborated in our co-pending Swedish patent application No. 9901325-2 entitled Radiation detector, an apparatus for use in planar radiography and a method for detecting ionizing radiation filed on Apr. 14, 1999, which application hereby is incorporated by reference. It shall further be appreciated that the avalanche amplification means may comprise a solid-state device or comprise a liquid amplification region.

A dielectric 49 may thus be arranged between avalanche cathode 21 and avalanche anode 27. This could be a gas or a solid substrate 49 carrying cathode 21 as shown in FIG. 2. The second voltage, which, during use, is applied between cathode 21 and anode 27, produces an electric field in a plurality of preferably gas-filled avalanche amplification regions 53. Electrical field lines between a single one of the readout elements 27 and the photocathode layer 18 are schematically indicated by reference numeral 51 in FIG. 2. The avalanche regions 53 are formed in a region between and around the edges of the avalanche cathode 21 which are facing each other, and between the avalanche cathode 21 and the avalanche anode 27, where, during use, a concentrated electric field will occur due to the applied voltages.

The avalanche regions 53 are formed by openings or channels in cathode 21 and in the dielectric substrate 49, if present. The openings or channels can be of arbitrary shape, e.g. having a circular or a square cross section. The openings or channels may be arranged in rows, each row of openings or channels including a plurality of openings or channels. A plurality of longitudinal openings or channels or rows of channels are formed beside each other, parallel with each other or with the incident X-rays. Alternatively, the openings or channels can be arranged in other patterns.

Conductive anode layer comprises a number of pads or strips 27, which also form the read-out elements, are arranged in connection with the openings or channels forming the avalanche regions 53. Preferably at least one element 27 is provided for each opening or channel. The elements 27 are electrically insulated from each other by means of substrate 29, and separately connected to the signal processing device (not illustrated).

By providing a plurality of read-out elements 27 as shown in FIG. 2 a detector 9 is achieved, wherein electron avalanches derivable mainly from ionization by transversely separated portions of the planar radiation beam 1 are separately detectable. Hereby, detector 9 provides for one-dimensional imaging. Preferably, the elements are elongated and pointed toward the radiation source. In such instance elements 27 are preferably put in a fan-shaped arrangement due to divergence of and finite distance to the radiation source.

The width of the inventive detector apparatus is preferably adapted to the intended use. Typical widths are up to 50 cm for medical X-ray applications, but for some particular applications the width may be as small as 0.1 mm comprising a single detector element.

In operation, the detector apparatus 9 of FIG. 1 is positioned in the path of the radiation desired to be detected. Rays of incident radiation emanating directly from the subject under examination will travel in a path so as to pass through collimator 11 and enter photocathode layer 18, whereas unwanted radiation scattered from the subject under examination towards the detection device will typically travel at some angle to the plane of the collimator and thus will not be able to traverse collimator 11.

Photons from the incident radiation hitting the photocathode layer 18 will cause electrons, so called photoelectrons, to be emitted. It is important that the material of the photocathode has a characteristic energy called work function (i.e. the binding energy of the cathode electrons) that is lower than the photon energy of the incident light so that electrons can be released.

The released photoelectrons, which will have a kinetic energy being the difference of the photon energy and the photocathode work function, are drifted towards the avalanche cathode 21 (which is held at a higher electric potential than the photocathode layer 18). At the avalanche cathode 21 the photoelectrons will be accelerated due to the strong concentrated electric field between the avalanche cathode 21 and anode 27, 29 arrangements (the avalanche anode layer 27 is held at a much higher electric potential than the avalanche cathode).

The accelerated electrons will interact with other substance (e.g. atoms, molecules etc.) in section 13 and regions 53, causing electron-ion pairs to be produced. Those produced electrons will also be accelerated in the field, and will interact repetitively with new material, causing further electron-ion pairs to be produced. This process continues during the travel of the electrons in the avalanche region towards anode arrangement 27, 29 located at the bottom of the avalanche region, and in such way electron avalanches are formed.

The electron avalanches induce electric pulses in the read-out elements of detector apparatus 9, which are individually detected as each readout element has its individual signal conduit to the signal processing device (not illustrated). The signal processing device processes the pulses; it possibly shapes the pulses, and integrates or counts thereafter the pulses from each readout element 27.

Figure 3:
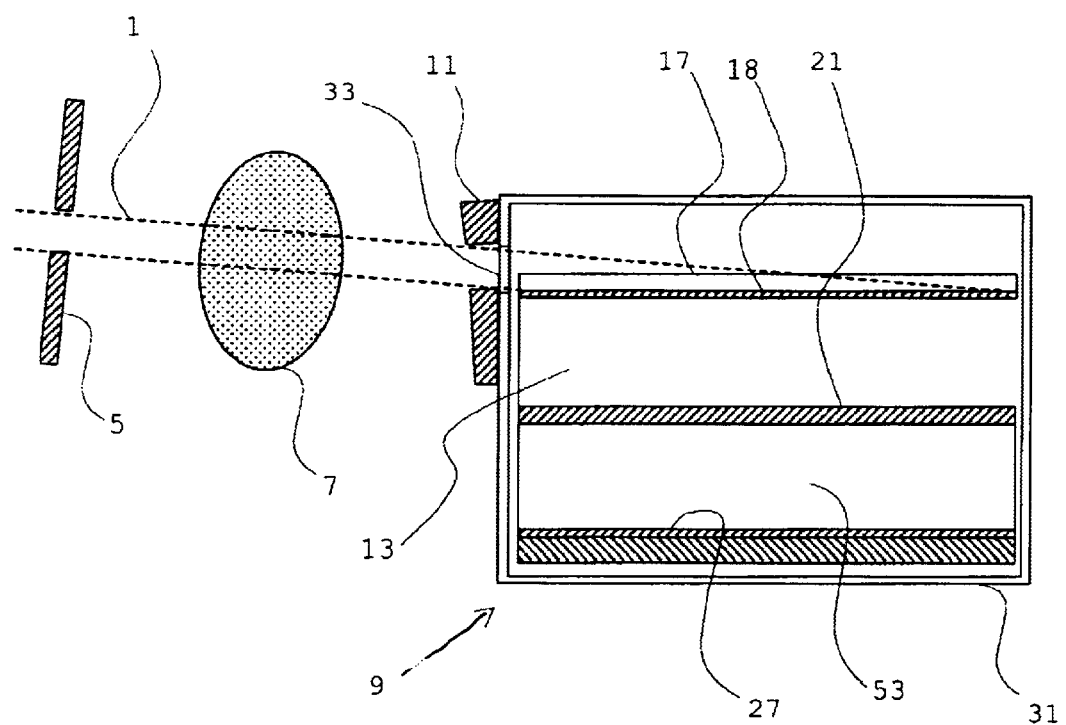
FIG. 3 illustrates schematically, in cross sectional view, an arrangement for planar beam radiography, according to a second embodiment of the present invention.

With reference next to FIG. 3, which schematically illustrates a device for planar beam radiography, a second embodiment of the present invention will be depicted. This embodiment is identical with the first embodiment except of how the incident radiation beam 1 is arranged to enter the detector and impinge on the photocathode arrangement 17, 18.

Apparatus 9 is here arranged such that the X-ray beam 1 can enter the apparatus through collimator 11 and hit the photocathode arrangement 17, 18 at grazing incidence from above. Substrate 17 has in this instance to be of a radiation transparent material such that radiation beam 1 can propagate through substrate 1 and be absorbed in photocathode layer 18.

It shall be appreciated that photocathode layer is thin such that it is capable of releasing electrons from the surface opposite to the surface onto which the photons are impinging.

It shall further be appreciated that as radiation beam 1 does not pass through chamber section on its travel towards photocathode layer 18, the gas mixture composition and pressure within chamber section 13 may be selected independently of how it absorbs the incident radiation.

Other features and characteristics of the inventive detector apparatus as described with reference to the first embodiment are also applicable as regards this second embodiment.

In the embodiments described above particular locations and geometries of photocathode, anode, cathode, and read-out arrangements are described. There are, however, a plurality of other locations and geometries that are equally well suitable in connection with the present invention.

It is general for the invention that each incident X-ray photon causes one induced pulse in one (or more) detector electrode element.

It is also general for the invention that the inter-electrode volumes are thin, which results in a fast removal of ions, which leads to low or no accumulation of space charges. This makes operation at high rate possible. The small distances leads also to low operating voltages, which results in low energy in possible sparks, which is favorable for the electronics. The focusing of the field lines in the avalanche means is also favorable for suppressing streamer formations, which leads to a reduced risk for sparks.

Further, there will in such instance be possible to geometrically discriminate unwanted radiation, such as fluorescent X-rays, which otherwise would lead to deteriorated spatial resolution and sensitivity. Such detection is further elaborated in our co-pending Swedish patent applications No. 9901326-0 entitled A method for detecting ionizing radiation, a radiation detector and an apparatus for use in planar beam radiography filed on Apr. 14, 1999 and No. 0000388-9 entitled Detector and method for detection of ionizing radiation filed on Feb. 08, 2000. These applications are hereby incorporated by reference.

As an alternative, the electric field in the conversion and drift gap (volume) can be kept high enough to cause electron avalanches, hence to be used in a pre-amplification mode.

As a further alternative, at least in some instances, the electrode arrangement 21 may be dispensed with, and an electric field between layer 18 and elements 27 can be kept high enough to cause electron avalanche amplification within the complete volume as defined by regions 13 and 53.

Further, all electrode surfaces may be covered by a resistive material in order to decrease the energy in possible sparks, which would influence the measurement and could destroy electronic equipment of the detector. Such resistive layers are further described in our co-pending Swedish patent application No. 9901327-8 entitled Radiation detector and an apparatus for use in radiography filed on Apr. 14, 1999. The application is hereby incorporated by reference.

Alternatively, for the same reason, the complete electrodes may be made of a semi-conducting material, e.g. silicon, or only layers 18 and 27 may be of a semi-conducting material.

It will be obvious that the invention may be varied in a plurality of ways. For example, the voltages can be applied in other ways as long as the described electrical fields are created. Such variations are not to be regarded as a departure from the scope of the invention. All modifications as would be obvious to one skilled in the art are intended to be included within the scope of the appended claims.

What is claimed is:

1. An apparatus for detection of radiation comprising:
    a photocathode layer having a first surface to release photoelectrons in dependence on incident radiation;
    a radiation entrance arranged such that a beam of radiation enters into the apparatus through said radiation entrance and impinges on said photocathode layer at grazing incidence;
    an electron avalanche amplifier facing the first surface of said photocathode to avalanche amplify photoelectrons released from said photocathode layer; and
    a readout arrangement to detect avalanche amplified electrons from said amplifier, wherein
        said radiation entrance is arranged so that the beam of radiation enters into the apparatus between said photocathode layer and said electron avalanche amplifier and impinges onto the first surface of said photocathode; and
        said photocathode layer releases photoelectrons from its first surface in response thereto.

2. The apparatus as claimed in claim 1 wherein the photocathode layer is 0.00001–0.1 mm thick.

3. The apparatus as claimed in claim 1 wherein the photocathode layer is of a material having a work function, which is lower than the photon energy of said radiation beam.

4. The apparatus as claimed in claim 1 wherein the photocathode layer is of CsI or an earth metal.

5. The apparatus as claimed in claim 1 wherein the photocathode layer is provided with a protective layer, said protective layer being transparent to electrons; and the photocathode layer releases photoelectrons through said protective layer.

6. The apparatus as claimed in claim 5 wherein the protective layer is opaque to light.

7. The apparatus as claimed in claim 6 wherein the protective layer is provided with a thin layer, which is transparent to electrons and opaque to light.

8. The apparatus as claimed in claim 1 wherein the radiation entrance is arranged such that the beam of radiation enters into the apparatus and impinges on said photocathode layer at a grazing angle $\alpha$, which is lower than 500 mrad.

9. The apparatus as claimed in claim 1 wherein the radiation entrance is provided with a window, which is transparent to said radiation beam.

10. The apparatus as claimed in claim 1 comprising a collimator arranged in front of said radiation entrance.

11. The apparatus as claimed in claim 1 wherein the electron avalanche amplifier includes an array of avalanche amplification regions filled with an avalanche amplification medium.

12. The apparatus as claimed in claim 11 wherein the avalanche amplification medium is a gas or a gas mixture.

13. The apparatus as claimed in claim 11 wherein the avalanche amplification medium is a liquid.

14. The apparatus as claimed in claim 11 wherein the avalanche amplification medium is a solid.

15. The apparatus as claimed in claim 11 wherein the individual avalanche amplification regions are separated from each other by a dielectric.

16. The apparatus as claimed in claim 1 wherein the electron avalanche amplifier includes an avalanche cathode and an avalanche anode arrangement, respectively.

17. The apparatus as claimed in claim 16 wherein the avalanche cathode is permeable to electrons.

18. The apparatus as claimed in claim 16 wherein the avalanche anode and readout arrangements are comprised of a single arrangement.

19. The apparatus as claimed in claim 1 wherein the readout arrangement includes an array of readout elements.

20. The apparatus as claimed in claim 1 wherein the radiation entrance is arranged such that a planar radiation beam enters into the apparatus through said radiation entrance and impinges on said photocathode layer at grazing incidence; and the read-out arrangement is arranged such that electron avalanches derivable mainly from absorption of transversely separated portions of said planar radiation beam are separately detectable.

21. An arrangement for use in planar beam radiography, said arrangement comprising an X-ray source, means for forming an essentially planar X-ray beam located between said X-ray source and an object to be imaged, and the detector as claimed in claim 1 located and arranged for detection of the planar X-ray beam as transmitted through or reflected off said object.

22. A method for detection of radiation in a detector apparatus comprising a radiation entrance, a photocathode layer, an electron avalanche amplifier, and a readout arrangement, said method comprising the steps of:
    introducing a beam of radiation into the detector apparatus through said radiation entrance such that said radiation beam impinges on a first surface of said photocathode layer at grazing incidence, wherein photoelectrons are released from said photocathode in response to said impinging radiation beam;
    avalanche amplifying the photoelectrons released from said photocathode layer by means of said electron avalanche amplifier; and
    detecting the avalanche amplified electrons by means of a readout arrangement, wherein
        said radiation beam is introduced into the apparatus between said photocathode layer and said electron avalanche amplifier; and
        the photoelectrons, which are avalanche amplified and subsequently detected, are released from the first surface of said photocathode layer.

23. The method as claimed in claim 22 wherein the introduced radiation beam comprises photons having a photon energy, which is higher than the work function of the photocathode layer.

24. The method as claimed in claim 22 wherein the beam of radiation is introduced such that it impinges on said photocathode layer at a grazing angle $\alpha$, which is lower than 500 mrad.

25. The method as claimed in claim 22 wherein the photoelectrons are avalanche amplified in an array of avalanche amplification regions filled with an avalanche amplification medium.

26. The method as claimed in claim 22 wherein a planar radiation beam is introduced into the apparatus through said radiation entrance such that it impinges on said photocathode layer at grazing incidence; and electron avalanches derivable mainly from absorption of transversely separated portions of said planar radiation beam are separately detected by means of said read-out arrangement.

27. The apparatus as claimed in claim 7 wherein said thin layer, which is transparent to electrons and opaque to light, is a metallic layer.

28. The apparatus as claimed in claim 1 wherein said radiation entrance is arranged so that the beam of radiation can be entered into the apparatus and can impinge on said photocathode layer at a grazing angle α, which is in the interval 0.05–500 mrad.

29. The apparatus as claimed in claim 1 wherein said radiation entrance is arranged so that the beam of radiation can be entered into the apparatus and can impinge on said photocathode layer at a grazing angle α, which is in the interval 0.50–50 mrad.

30. The method as claimed in claim 22 wherein said beam of radiation is introduced so that said beam of radiation impinges on said photocathode layer at a grazing angle α which is in the interval 0.05–500 mrad.

31. The method as claimed in claim 22 wherein said beam of radiation is introduced so that said beam of radiation impinges on said photocathode layer at a grazing angle α, which is in the interval 0.50–50 mrad.

32. The method as claimed in claim 22, wherein any light photons emitted in the detector apparatus are prevented from reaching the photocathode by means of a metallic layer, which is opaque to light.

33. The method as claimed in claim 32, wherein said layer preventing any light photons emitted in said detector apparatus from reaching said photocathode is a metallic layer.

34. The method as claimed in claim 22, wherein the photoelectrons are avalanche amplified in an array of avalanche amplification regions filled with an avalanche amplification medium.

35. The method as claimed in claim 34, wherein said avalanche amplification medium is a gas or gas mixture.

36. The method as claimed in claim 22, wherein a planar radiation beam is introduced into the apparatus through said radiation entrance such that it impinges on said photocathode at grazing incidence; and electron avalanches derivable mainly from absorption of transversely separated portions of said planar radiation beam are separately detected by means of said read-out arrangement, which includes an array of readout elements.

37. The method according to claim 25, wherein the avalanche amplification medium is an ionizable gas.

* * * * *